(12) United States Patent
Hutchinson et al.

(10) Patent No.: US 11,223,843 B2
(45) Date of Patent: Jan. 11, 2022

(54) APPARATUS AND METHOD FOR GENERATING A LAPLACIAN PYRAMID

(71) Applicant: Avago Technologies International Sales Pte. Limited, Singapore (SG)

(72) Inventors: James Andrew Hutchinson, Cambridge (GB); Thomas Oscar Miller, Cambridge (GB); Stephen John Barlow, Cambridge (GB); Jack Stuart Haughton, Cambridge (GB)

(73) Assignee: Avago Technologies Sales Pte. Limited, Singapore (SG)

( * ) Notice: Subject to any disclaimer, the term of this patent is extended or adjusted under 35 U.S.C. 154(b) by 161 days.

(21) Appl. No.: 16/493,912

(22) PCT Filed: Mar. 9, 2018

(86) PCT No.: PCT/GB2018/050612
§ 371 (c)(1),
(2) Date: Sep. 13, 2019

(87) PCT Pub. No.: WO2018/167465
PCT Pub. Date: Sep. 20, 2018

(65) Prior Publication Data
US 2020/0329252 A1    Oct. 15, 2020

(30) Foreign Application Priority Data
Mar. 15, 2017    (GB) ...................................... 1704154

(51) Int. Cl.
*G06K 9/36*    (2006.01)
*H04N 19/50*    (2014.01)
(Continued)

(52) U.S. Cl.
CPC ........... *H04N 19/50* (2014.11); *H04N 19/115* (2014.11); *H04N 19/124* (2014.11); *H04N 19/15* (2014.11); *H04N 19/172* (2014.11)

(58) Field of Classification Search
CPC .... H04N 19/50; H04N 19/115; H04N 19/124; H04N 19/15; H04N 19/172;
(Continued)

(56) References Cited

U.S. PATENT DOCUMENTS 5,768,535 A * 6/1998 Chaddha ............ H04N 7/17336
348/E7.073
5,864,780 A    1/1999 Kossentini et al.
(Continued)

FOREIGN PATENT DOCUMENTS

EP    0739140 A2    10/1996
WO    WO 99/52297 A1    10/1999

OTHER PUBLICATIONS

UK Search Report for corresponding GB Appl No. 1704154.2, dated Sep. 10, 2018.
(Continued)

*Primary Examiner* — Gims S Philippe
(74) *Attorney, Agent, or Firm* — Morgan, Lewis & Bockius LLP (57) ABSTRACT

An image processing apparatus is provided that comprises an input configured to receive an image and a Laplacian generator configured to generate, from the image, a Laplacian pyramid that represents the image as a series of frames that contain different frequency components of the image. The image processing apparatus also comprises a compressor configured to compress the Laplacian pyramid for writing to memory.

15 Claims, 6 Drawing Sheets

(51) Int. Cl.
*H04N 19/115* (2014.01)
*H04N 19/124* (2014.01)
*H04N 19/15* (2014.01)
*H04N 19/172* (2014.01)

(58) Field of Classification Search
CPC ...... H04N 19/635; H04N 19/21; H04N 19/63; G06T 9/00; G06T 3/4038; G06T 2207/20221
See application file for complete search history.

(56) References Cited

U.S. PATENT DOCUMENTS

| | | | |
|---|---|---|---|
| 2003/0231797 A1 | 12/2003 | Cullen et al. | |
| 2009/0041365 A1* | 2/2009 | Meany | H04N 19/63 382/248 |
| 2010/0142790 A1* | 6/2010 | Chang | G06T 5/009 382/132 |
| 2010/0183071 A1* | 7/2010 | Segall | H04N 5/2355 375/240.16 |
| 2012/0232908 A1* | 9/2012 | Terriberry | G10L 19/022 704/500 |
| 2013/0293738 A1* | 11/2013 | Kulkarni | G06T 9/00 348/222.1 |
| 2014/0307798 A1* | 10/2014 | Taubman | H04N 19/63 375/240.16 |
| 2017/0070697 A1* | 3/2017 | Chen | H04N 21/4263 |
| 2019/0378305 A1* | 12/2019 | Fitzgerald | H04N 19/167 |

OTHER PUBLICATIONS

International Search Report for corresponding PCT Appl No. PCT/GB2018/050612, dated Jun. 8, 2018.

Cheung & Smyth, "An efficient source coding scheme for progressive image transmission," Proc. ISIT, 1991. Accession No. XP0 10046885.

Buert & Adelson, "The Laplacian pyramid as a compact image code", IEEE Transactions on Communications COM-31, No. 4, Apr. 1, 1983 Available at http://persci.mit.edu/pub_pdfs/pyramid83.pdf. [Accessed Sep. 7, 2018].

Jeff Perry, "Image Compression Using Laplacian Pyramid Encoding", Dec. 1, 1997 (Dec. 1, 1997), XP002780221, Retrieved from the Internet: URL:http://collaboration.cmc.ec.gc.ca/science/rpn/biblio/ddj/Website/articles/CUJ/19_97/9712/perry/perry.htm [retrieved on Apr. 18, 2018].

Naccari Matteo et al., "Binary alpha channel compression for coding of supplementary video streams", 2013 IEEE 15th International Workshop On Multimedia Signal Processing (MMSP), IEEE, Sep. 30, 2013 (Sep. 30, 2013), pp. 200-205, XP03252433.

* cited by examiner

APPARATUS AND METHOD FOR GENERATING A LAPLACIAN PYRAMID

This invention relates to an apparatus and method for processing images.

A "normal" camera lens is one that produces images that generally look natural to the human eye because there is no significant expansion or contraction distorting the perspective. Special lenses—such as fish-eye lenses—can be used to generate images with very wide angles of view. Typically, the perspective in these images will look distorted to the human observer. Some cameras may use multiple lenses, or a mechanism for moving a single lens between different imaging positions, to generate a wide-angle image. Multiple camera images can be stitched together to form a single image having a wider field of view that any of the lenses generate individually. It is possible to stitch together enough images to create a 360° image.

The process of stitching together multiple overlapping images may be achieved using a multiband blend process. Each level of the process may blend together decimated representations of the original camera images. This process may be performed over multiple levels, with each successive level of the process blending representations that are progressively decimated with respect to the original camera images.

UK Patent Application Number 1606746.4, the contents of which are incorporated herein by reference, describes a transform and filter block that generates a series of progressively decimated images. These images form a "Gaussian pyramid". The resulting series of images is then streamed into memory, to be retrieved by a pyramid sum block during a later stage of processing. Storing the reduced images requires memory bandwidth, which should preferably be kept to a minimum. The reduced images may be compressed before being stored. This reduces memory bandwidth requirements but can involve some complicated operations.

According to a first aspect, an image processing apparatus is provided that comprises an input configured to receive an image and a Laplacian generator configured to generate, from the image, a Laplacian pyramid that represents the image as a series of frames that contain different frequency components of the image. The image processing apparatus also comprises a compressor configured to compress the Laplacian pyramid for writing to memory.

Other aspects may include one or more of the following:

Each frame may be formed from a plurality of values and the compressor may comprise an encoder that is configured to compress a frame by assigning a respective code to each value in that frame. The encoder may be configured to assign codes that are formed from variable numbers of bits. The encoder may be configured to assign the codes such that the number of bits in a code is dependent on a magnitude of the value to which that code is assigned. The encoder may be configured to assign the codes such that values having a relatively high magnitude are assigned codes formed from more bits than codes that are assigned to values having a relatively low magnitude.

The compressor may be configured to compress the Laplacian pyramid by compressing some, but not all, of the frames in the series. Each frame may correspond to a respective level of the Laplacian pyramid, the compressor being configured to determine whether or not to compress a frame in dependence on which level of the Laplacian pyramid the frame corresponds to. Each frame may be formed from a plurality of values and the compressor may comprise a quantiser that is configured to set some of those values to zero. The quantiser may be configured to determine which values to set to zero in dependence on a respective magnitude of those values. The quantiser may be configured to set all values that are within a predetermined magnitude of zero to zero. The quantiser may be configured to vary the predetermined magnitude within a frame.

The compressor may comprise a rate controller that is configured to control how the quantiser varies the predetermined magnitude in order to achieve a target bit rate. The compressor may comprise a rate controller that is configured to control how the quantiser varies the predetermined magnitude in dependence on a current bit rate. The rate controller may be configured to control how the quantiser varies the predetermined magnitude within a frame in dependence on a difference between a number of bits already used to encode that frame and a target number of bits for encoding a part of the frame that has already been encoded.

Each frame may be formed from a plurality of values and each value belongs to a channel, and the compressor comprises a predictor that is configured to perform a prediction on some, but not all, of the channels. Each channel may correspond to a different type of data and the predictor may be configured to determine whether or not to perform a prediction on a channel in dependence on a type of the data that the channel corresponds to. One or more of the channels may correspond to pixel data that defines an appearance of a pixel, the predictor being configured not to perform a prediction on a channel that corresponds to pixel data. One or more of the channels corresponds to blending data that defines how frames generated from different images should be blended together, the predictor being configured to perform a prediction on a channel that corresponds to blending data.

According to a second aspect, a method is provided that comprises receiving an image, generating, from the image, a Laplacian pyramid that represents the image as a series of frames that contain different frequency components of the image and compressing the Laplacian pyramid for writing to memory.

The present invention will now be described by way of example with reference to the accompanying drawings. In the drawings.

Figure 1:
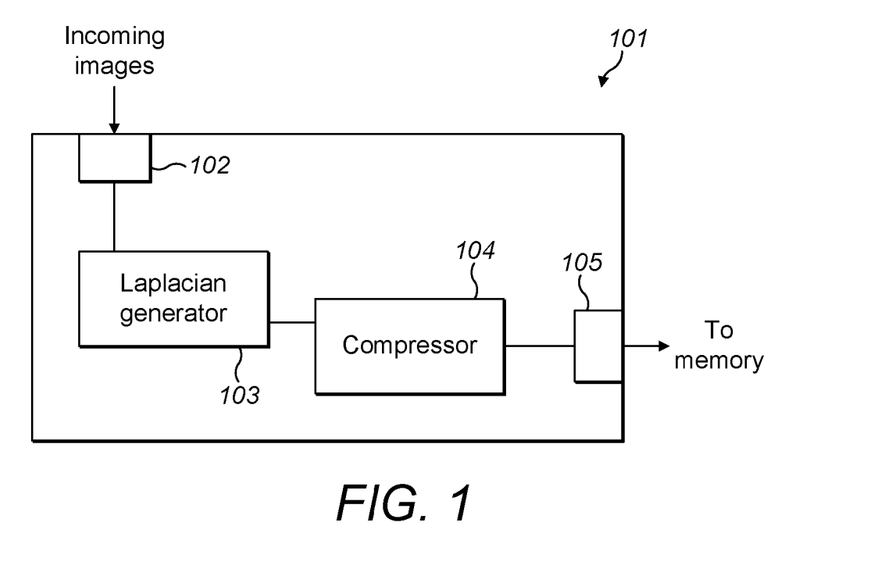
FIG. 1 shows an example of an image processing apparatus.

An example of an image processing apparatus is shown in FIG. 1. The apparatus, shown generally at 101, comprises an input 102 that is configured to receive an image. That image could be any image-related data. In one implementation, it will be an image, initially captured by a camera, that has undergone some subsequent processing. That subsequent processing may be a transformation to form a equirectangular, cylindrical or rectilinear image for inputting into the image processing apparatus.

The apparatus also comprises a Laplacian generator 103. The Laplacian generator is configured to generate a Laplacian pyramid from the image. The Laplacian pyramid represents the image as a series of frames. Those frames contain different frequency components of the image. The frames are bandpass images; each frame represents the original image within a limited bandwidth. The Laplacian pyramid has multiple levels and each level has a frame corresponding to a different bandwidth. The frequencies getting progressively higher in each successive step up the pyramid.

Figure 4:
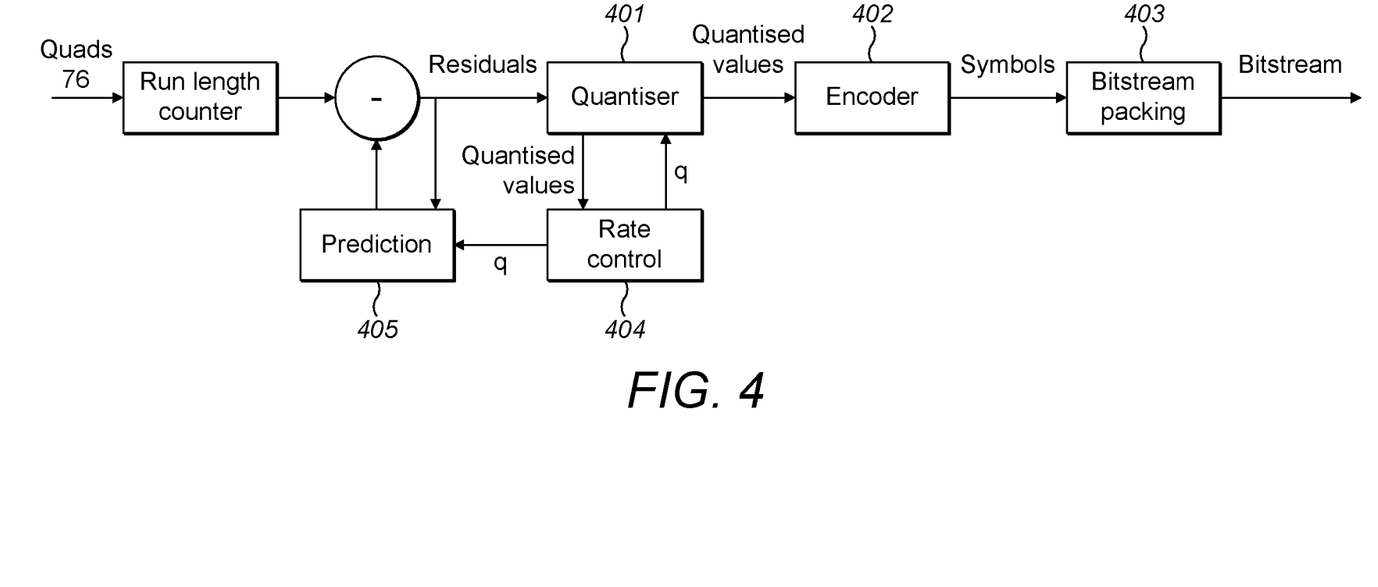
FIG. 4 shows a detailed example of a compressor.

The Laplacian generator may be configured to use any suitable process for generating the Laplacian pyramid. One efficient process is described in more detail below and involves a process of repeatedly downsampling, upsampling and subtracting. In this arrangement, the Laplacian generator comprises a reduce filter, an expand filter and a subtraction unit. Starting with the original image, each frame in the Laplacian pyramid is formed by reducing an image from the preceding level of the pyramid, expanding that reduced image and subtracting the expanded image from the image of the preceding level. The reduced image then becomes the "image associated with the preceding level" for the next iteration of the process. This process can be efficiently implemented by a pipeline arrangement. An example is shown in FIG. 4 and described in more detail below.

Finally, the image processing apparatus 101 also comprises a compressor 104. The compressor is configured to compress the Laplacian pyramid for writing to memory via output 105. The Laplacian pyramid may be retrieved from memory subsequently, for example as part of a multiband blend process. A multiband blend typically stitches together frames from the Laplacian pyramids generated from multiple camera images, so it may be convenient to store the pyramids generated from some camera images before the remainder are generated. Although intuitively it may appear preferable for memory bandwidth reasons to store the reduced images and generate the Laplacians during the multiband blend process, in practice the Laplacian pyramid has some inherent properties that make it particularly efficient to compress for storage. The compressor could be configured to cause the Laplacian pyramid to be stored for any reason, and it is not limited to causing the pyramid to be stored for the specific purpose of multiband blending.

Figure 2:
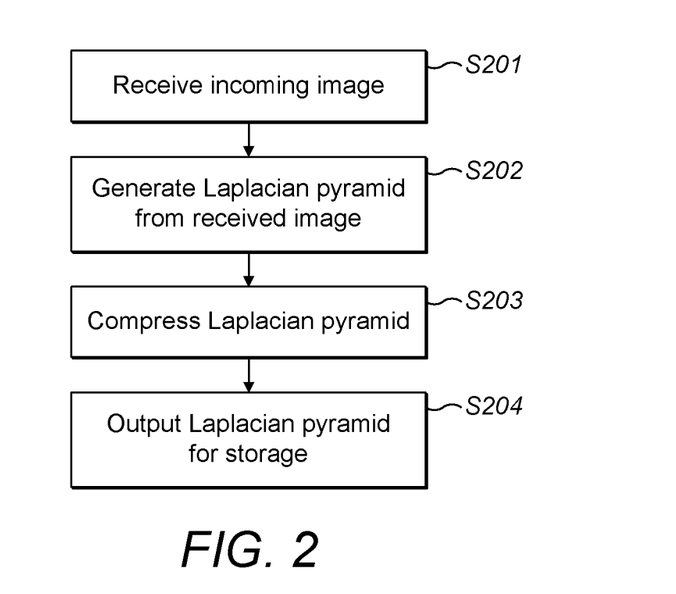
FIG. 2 shows an example of a method for processing images.

A broad overview of a method that may be implemented using an apparatus such as that shown in FIG. 1 is shown in FIG. 2. The method starts with receiving an image (step S201). It then comprises generating a Laplacian pyramid from the image (step S202). As explained above, the Laplacian pyramid represents the image as a series of frames that contain different frequency components of the image. The pyramid is then compressed (step S203) and output for writing to memory (step S204).

The image that is received by the image processing apparatus will be formed from a plurality of pixels. Each pixel is likely to be represented by its own set of pixel values. It is these values that define how the pixel appears to the viewer, e.g. when displayed on a screen. The pixel values are determined by the colour model. Examples of suitable colour models include RGB and YUV. The specific examples described below make use of the YUV colour model, in which Y is the luma component (brightness) and U and V are the chroma components (colour). Each pixel value can be considered to represent a particular "channel". Another "channel" may be provided by the alpha value, which often accompanies the pixel values in the frames formed via the processes described below. The alpha values define how the frames for different images should be blended together during the pyramid sum. The chroma channels U and V are commonly downsampled by a factor of two with respect to the luma channel. This is known as YUV420. The same downsampling is applied to the alpha channel. Thus, the apparatus receives image data in the form of "quads", comprising 4 luma pixels, 2 chroma pixels and an alpha value.

An example of an image processing pipeline will now be described in more detail with reference to a system that is configured to process multiple images at a time. One possible application of such a system is to produce spherical video content. For example, the multiple images may be photographs taken by six individual cameras. Each camera may represent one face of a cube. The pipeline's role is then to stitch together groups of six images to output a video stream of spherical images. This is done by first transforming the camera images. A Laplacian pyramid is generated for each transformed image through a series of filtering, downsampling and upsampling operations. The resulting Laplacian pyramids are blended together using multiband blending to create the final stitched output.

Generation of the Laplacian Pyramid

Figure 3:
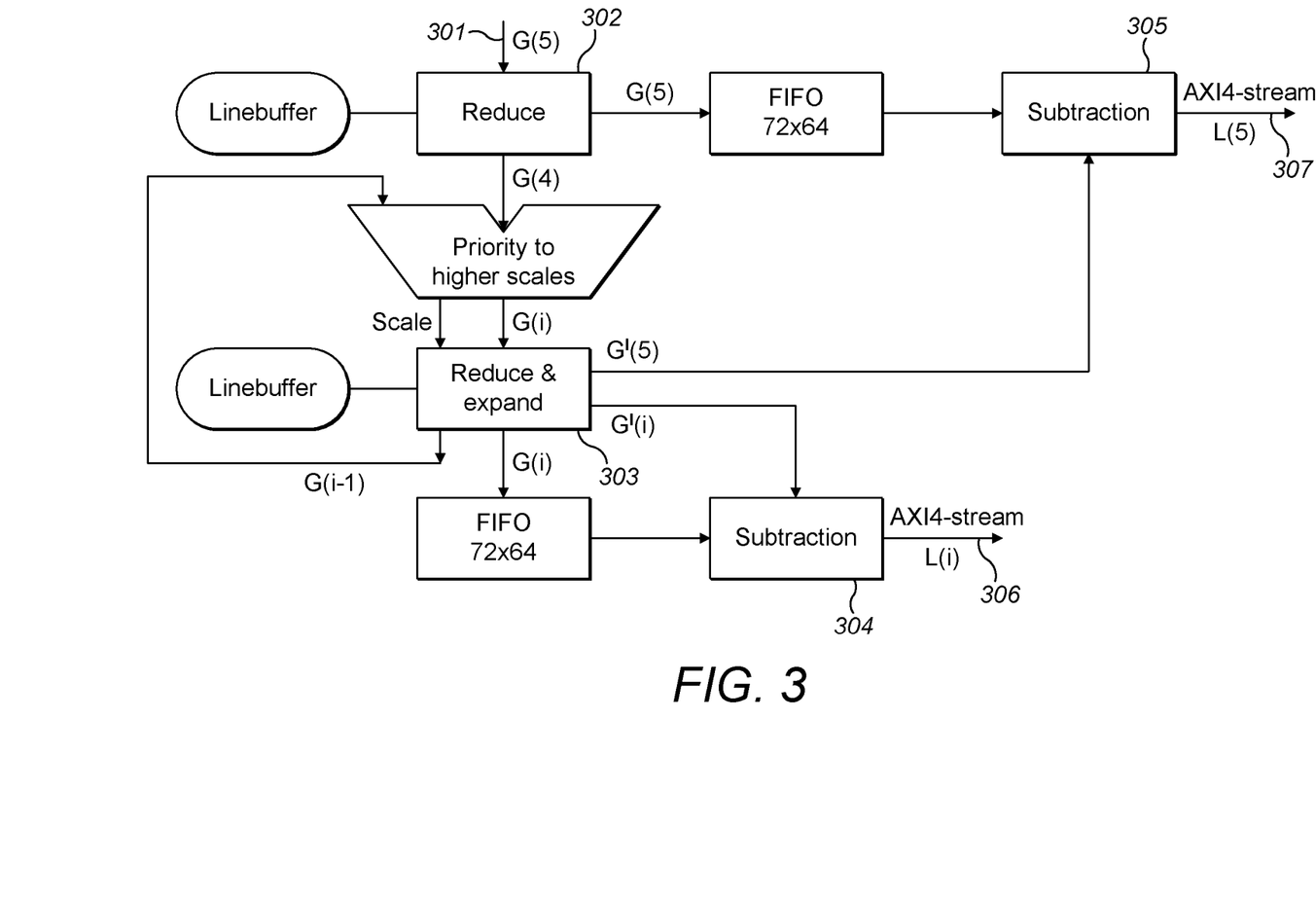
FIG. 3 shows a detailed example of a Laplacian generator.

FIG. 3 shows a more detailed example of a Laplacian generation block. The Laplacian generation block comprises reduce filters 302, 303, expand filters 303 and subtraction units 304, 305. The filtering process broadly comprises a downsampling performed by a reduce filter followed by an upsampling performed by an expand filter. The output of the first expand filter is subtracted from the original frame, so that only the high frequency components are preserved. This process is repeated multiple times to create the Laplacian pyramid of different frequency components.

The Laplacian generation block is configured to receive incoming images 301. These images are suitably transformed versions of the original camera photographs. (The output of the preceding transform pipeline is represented by $G(5)$ in FIG. 3.) Once the pixels have been transformed, the Gaussian and Laplacian pyramids can be constructed by applying a series of filters.

The first stage in generating the Laplacian pyramid is to construct a Gaussian pyramid using reduce filters 302, 303. Each reduce filter may be a five-tap Gaussian filter that implements decimation by two, so the image is downsampled by two in each dimension after each application of the filter. The filter is preferably separable, so it can be applied vertically first, and then horizontally.

The Gaussian pyramid is defined by:

$$G(i)=\text{Reduce}(G(i+1)), 0 \leq i \leq 4$$

This filter may be repeated a further four times, to give a Gaussian pyramid with six levels.

The Gaussian pyramid is then converted to a Laplacian pyramid by passing each Gaussian frame through an expand filter and subtracting it from the Gaussian frame above it in the pyramid. The expand filter upscales the incoming image using a Gaussian filter. The filter can be thought of as the same as the one used in the reduce filter with pixels of value zero inserted for every odd row and column. Because of this the filter has two forms, one for even rows/columns and one for odd rows/columns. The expand filter produces a frame which is upscaled by two in both dimensions.

For every level of the Gaussian pyramid other than the lowest, the Laplacian pyramid is produced by subtracting the luma and chroma channels of the Gaussian frame from the result of applying the reduce and expand filters to the same frame.

The Laplacian pyramid is defined by:

$$L(i)=G(i)-\text{Expand}(G(i-1)), 1 \leq i \leq 5$$

$$L(0)=G(0)$$

The throughput requirement of each subsequent filter is quartered compared to the preceding filter. It is therefore possible to share reduce and expand filters. Sharing may be possible for all but the highest scale of the pyramid. This is represented in FIG. 3 by the separation between reduce filters 302 and 303.

In the specific example shown in FIG. 3, operations of the Laplacian generation block are controlled over an AXI4-Lite register interface. The block operates on YUV420 pixels and processes one quad per cycle. Each of the channels is effectively downsampled independently. Conceptually, the Y values from the quads are put together to form one image of full resolution that is then downsampled separately from the chroma channels. Similarly, the expand filter is applied to each channel independently. The block runs at 600 MHz, which gives a throughput of 80 Mpixels/frame at 30 frames/second.

The Laplacian generation block may also calculate and downsample an alpha mask. This mask is used in a subsequent processing to choose the relative contribution of each camera as the pyramid block flattens the pyramids together. There is only one alpha value per quad. This value can be thought of as the minimum Euclidean distance from the resampling point and the edge of the frame. The alpha values are not subtracted and the alpha values may be stored in Gaussian rather than Laplacian form. Therefore, since expanded alpha values are not needed to produce a Laplacian pyramid, they are not passed through the expand filter.

The Laplacian generation block outputs a Laplacian pyramid represented in FIG. 3 by L(5) and L(i) (307 and 306 respectively) to the compression block that follows.

Compression of the Laplacian Pyramid

A more detailed example of a compression pipeline is shown in FIG. 4. The pipeline comprises quantiser 401, an encoder 402, a packing block 403, a rate controller 404 and a prediction block 405.

The compression block is configured to compress data before it is written to SDRAM (synchronous dynamic random access memory). This includes the Laplacian pyramids. This data tends to be heavily biased towards zero and so good compression is achieved without prediction. This can be explained with reference to FIG. 5.

Figure 5:
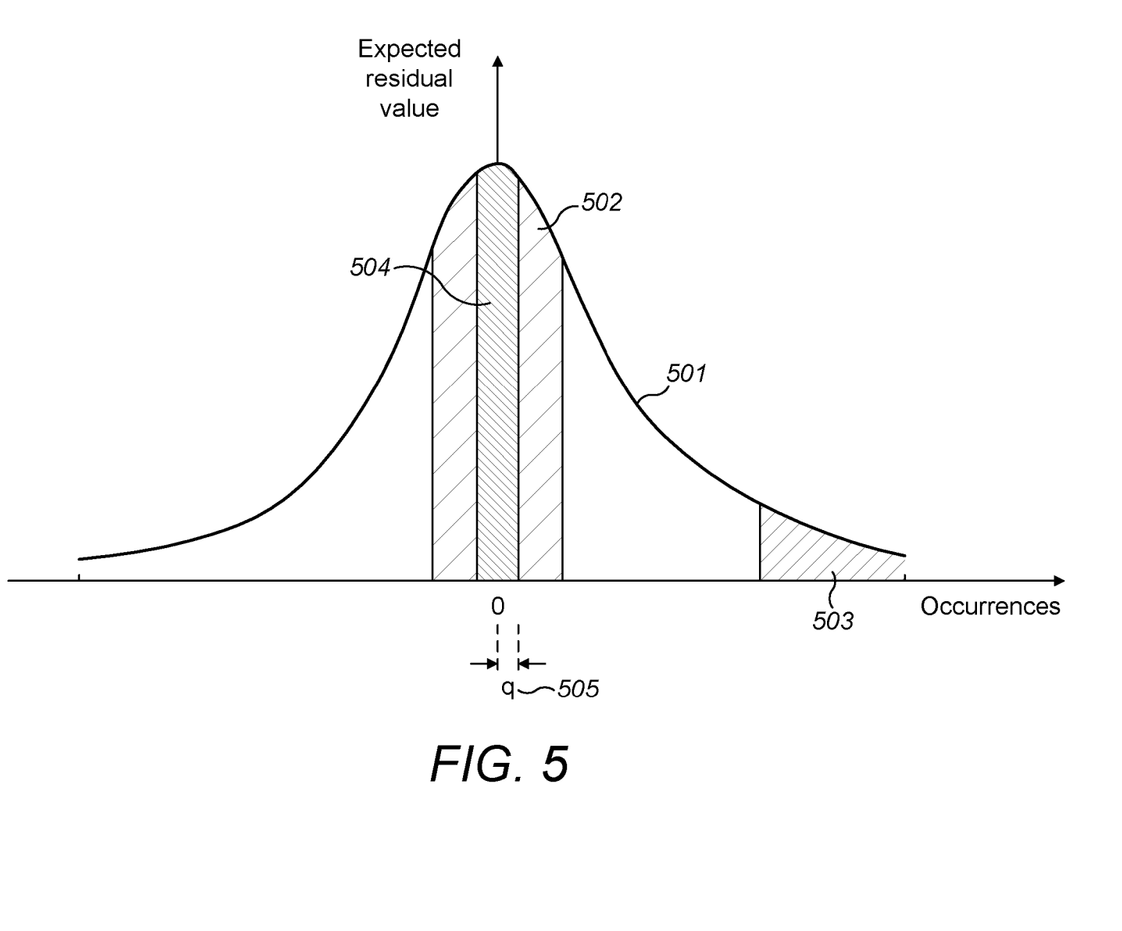
FIG. 5 illustrates the process of quantisation.

Each frame in a Laplacian pyramid is formed from a plurality of values. These values are differences, which is why they tend to be heavily skewed towards zero. This is shown in FIG. 5. The line 501 represents an expected distribution of values in a Gaussian pyramid. It shows that these values are concentrated around zero. To compress the pyramid, the encoder 402 can be configured to assign each value a respective code. The codes may be variable in length, so that pyramid values are encoded with different numbers of bits. Suitably the number of bits that is assigned to encoding a value is dependent on its magnitude. More bits are suitably assigned to higher (and thus less common) values. In FIG. 5, suitably fewer bits are assigned to values in region 502 than are assigned to region 503. For example, values in region 502 could be encoded using 2 bits whereas values in region 503 could be encoded using 14 bits.

The compressor may be configured to compress the Laplacian pyramid by compressing some, but not all, of the frames in the series. The compressor may decide whether or not to compress a frame in dependence on which level of the Laplacian pyramid the frame corresponds to. For example, the smallest three levels of the Laplacian pyramid may be stored uncompressed. These frames are commonly only 2% of the size of the largest level of the pyramid, so there is little benefit in compressing them.

In one example, the encoder may be configured to encode the pyramid values using bucket coding, which is described in more detail below.

Quantisation

Quantiser 401 may precede encoder 402. It is configured to quantise values in the Laplacian pyramid. Since these values are differences formed via a subtraction operation, they can also be termed "residuals". The decision about whether or not to set a particular value to zero is preferably taken in dependence on the magnitude of that value. In one example, the quantisation scheme sets all residuals within a predetermined range around zero to zero. This creates a so-called "dead zone", which is represented by region 504 in FIG. 5.

The quantisation reduces the amount of data that needs to be stored at the expense of losing some information. However, many of the residuals around zero are the result of noise, meaning that information loss should be minimal. Setting residuals in the dead zone to zero not only reduces the number bits that are required to encode those residuals, it also frees up shorter codes for encoding larger residuals with fewer bits than would otherwise be the case.

For a residual, r, and a quantising parameter q (505), the quantised residual, v, is given by:

$$v = \begin{vmatrix} 0 & |r| \leq q \\ r - \mathrm{sgn}(r)q & |r| > q \end{vmatrix}$$

For a quantised residual, v, and a quantising parameter q, the dequantized residual, r, is given by:

$$r = v + \mathrm{sgn}(v)q$$

Quantisation of the residuals can also advantageously be used to control the rate of the bit stream. This can be achieved by the quantiser altering the size of region 504 within a frame.

The size of the dead-zone increases as the "quantising parameter" q increases in size. This has the effect of sacrificing small changes whilst preserving large changes. The quantising parameter may adapt throughout a frame. The size of the quantising parameter is suitably chosen to achieve a target number of bits for each pixel. This enables the compression block to adapt to the memory constraints of the system.

Rate Control

Rate control is used to achieve a target number of bits per quad. The rate controller 404 is configured to control how the quantiser varies the size of the dead zone by providing the quantiser with the quantising parameter. The aim of the rate controller is suitably to achieve a target bit rate. The rate controller may be configured to adjust the quantising parameter on a per quad basis in dependence on the target.

The rate controller 404 may choose the quantising parameter based on the current bitrate and the target bitrate. The term "current" may refer to the pyramid that is currently being processed by the compressor or to an individual frame. The quantising parameter may be proportional to the difference between the number of bits spent so far in the current frame, A, and a target number of bits to be spent at this point in the current frame, T:

$$q = \left\lfloor \frac{A - T + 4095}{8192} \right\rfloor$$

(A−T) may be stored in the rate controller as a 32-bit signed number. It is suitably clamped within the range $[-2^{31}, 2^{31}-1]$.

The target is calculated by accumulating a target number of bits per quad for the quads processed so far in the current frame. These target numbers may be supplied to the rate controller by a register. For example, the rate controller may be configured to calculate and accumulate the number of bits which will be required to encode a quad (including padding).

The choice of quantising parameter may be delayed by one symbol to ease timing, particularly for hardware implementations. In this scenario, the first two symbols will use a quantiser of zero. The quantiser for the third symbol will be based on the bitrate error from the first symbol and so on.

Alpha Prediction

The compressor in FIG. 4 includes a predictor 405. The predictor is configured to perform a prediction on some, but not all, of the channels represented by the quads. Suitably the predictor chooses which channels to predict in dependence on the type of data that they represent. The Y, U and V channels are preferably not predicted. As explained above, the values for these channels are taken from a Laplacian pyramid and are therefore already heavily skewed towards zero. There is little to be gained from prediction in this case, and not performing prediction reduces compression complexity. However, the alpha channel, which defines how frames from different images should be blended together, is not formed from residual values and does benefit from prediction.

The alpha channel may be predicted by predictor 405. The alpha channel is expected to be smooth. It can be predicted using a gradient from two contexts. $\alpha_0$ can be predicted from $\alpha_{-2}$ and $\alpha_{-3}$. This is shown in 1 below. Here $\alpha_{-1}$ is the previous value; $\alpha_{-2}$ is the value before that, and so on.

TABLE 1

| Alpha prediction context | | | |
|---|---|---|---|
| $\alpha_{-3}$ | $\alpha_{-2}$ | $\alpha_{-1}$ | $\alpha_0$ |

The predicted value for $\alpha_0$ can be derived as:

$$\max(0, \min(1023, 3\alpha_{-2} - 2\alpha_{-3}))$$

The gap of one before a value is used for prediction is helpful to ease timing for hardware implementations, especially since the prediction uses reconstructed values after quantisation.

Where insufficient context is available for the prediction to be calculated, the predictor is suitably configured to set the prediction to zero.

Given a predicted alpha, p, and an alpha value, $\alpha$, the residual, r, can be given by the following:

$$r = \begin{vmatrix} p - \alpha & |p - \alpha| \leq \min(p, 1023 - p) \\ \frac{\alpha}{2} - p \& 512 & \alpha \equiv 0 \pmod{2} \wedge |p - \alpha| > \min(p, 1023 - p) \\ -\frac{\alpha + 1}{2} - p \& 512 & \text{otherwise} \end{vmatrix}$$

Given a predicted alpha, p, and a residual, r, the alpha value, $\alpha$, can be given by the following:

$$\alpha = \begin{vmatrix} p - r & |r| \leq \min(p, 1023 - p) \\ 2r & ((r \geq 0 \wedge p < 512) \vee \\ & (r < 0 \wedge p \geq 512)) \wedge |r| > \min(p, 1023 - p) \\ -2r - 1 & \text{otherwise} \end{vmatrix}$$

Bucket Coding

Once the quantised residuals have been computed, they are output to the encoder 402 and encoded. This is preferably done using a variable length code.

First, the input domain [−1024, 1023] is mapped to an all positive domain [0-2047]:

$$u = \begin{vmatrix} -2v - 1 & v < 0 \\ 2v & v \geq 0 \end{vmatrix}$$

This domain is then divided into four buckets, each of which is given a power-of-two size, with the sum of the sizes constrained to be greater than or equal to 2048. For instance, with bucket sizes $2^0$, $2^0$, $2^1$ and $2^{11}$, the buckets would contain the following ranges:

TABLE 2

| Bucket ranges | |
|---|---|
| Bucket | u range |
| 0 | 0 |
| 1 | 1 |
| 2 | 2-3 |
| 3 | 4-2047 |

Residuals may be encoded as a two-bit bucket ID and an n-bit offset within the indicated bucket, where n is $\log_2$ of the bucket size. For example, using the above bucket configuration, the value 2 would be encoded as 10 0 (bucket 2, offset 0), whilst value 7 would be encoded as 11 0000000011 (bucket 3, offset 3).

This scheme works well as low ranges, common in Laplacians, can be encoded in few bits by making the low buckets small, leaving the larger high buckets to take uncommon high values.

The encoder may be configured to implement bucket coding by performing the following steps:
1. Convert the signed quantised value (v) to an unsigned one (u).
2. Find the bucket which contains the unsigned value.
3. Subtract the lower limit of the bucket from the unsigned value.
4. Output the coded value and bucket.

Figure 6:
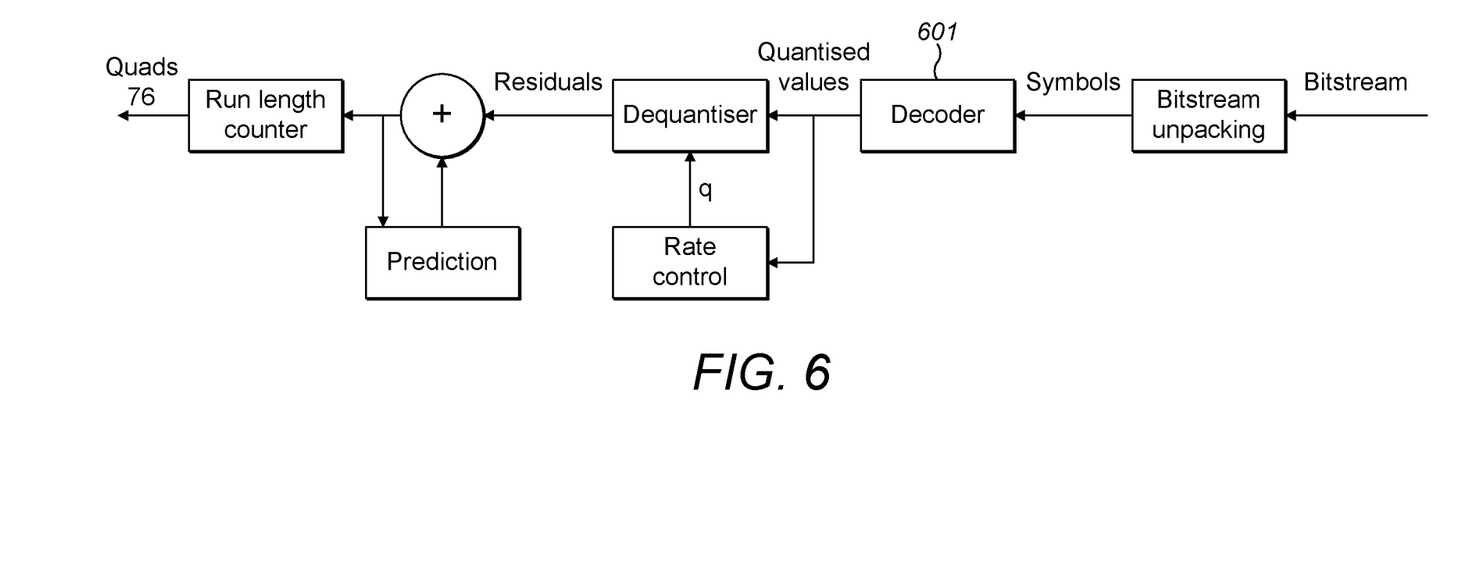
FIG. 6 shows a detailed example of a decompressor.

These steps may be reversed by a corresponding decoder shown at 601 in the corresponding decompression pipeline shown in FIG. 6:
1. Add the lower limit of the bucket to the coded value
2. Convert the value from unsigned to signed.
3. Output the quantised residual.

Suitable choices of buckets for the different channels are shown in 3.

TABLE 3

| Bucket configuration | | | | | |
|---|---|---|---|---|---|
| Level | Channel | Bucket 0 | Bucket 1 | Bucket 2 | Bucket 3 |
| 5 (Largest) | Y | 3 | 4 | 6 | 11 |
| 5 (Largest) | U | 2 | 3 | 5 | 11 |
| 5 (Largest) | V | 2 | 3 | 5 | 11 |
| 5 (Largest) | $\alpha$ | 0 | 2 | 4 | 10 |
| 4 | Y | 2 | 4 | 6 | 11 |
| 4 | U | 2 | 3 | 5 | 11 |
| 4 | V | 1 | 2 | 4 | 11 |
| 4 | $\alpha$ | 0 | 3 | 5 | 10 |

TABLE 3-continued

| Bucket configuration | | | | | |
|---|---|---|---|---|---|
| Level | Channel | Bucket 0 | Bucket 1 | Bucket 2 | Bucket 3 |
| 3 | Y | 3 | 5 | 7 | 11 |
| 3 | U | 2 | 3 | 5 | 11 |
| 3 | V | 1 | 2 | 5 | 11 |
| 3 | α | 0 | 4 | 6 | 10 |

Pyramid Sum

The pyramid sum block takes Laplacian pyramids and blends them together using multiband blending. In one example, each Laplacian pyramid may represent one camera frame. The pyramid sum block also uses the alpha data that was generated by the Laplacian generation block. Suitably the block uses that data to calculate a normalised alpha mask for each camera. Each level of the Laplacian pyramid is then multiplied by its respective alpha mask and an appropriate gain coefficient, as part of the multiblend process.

Figure 7:
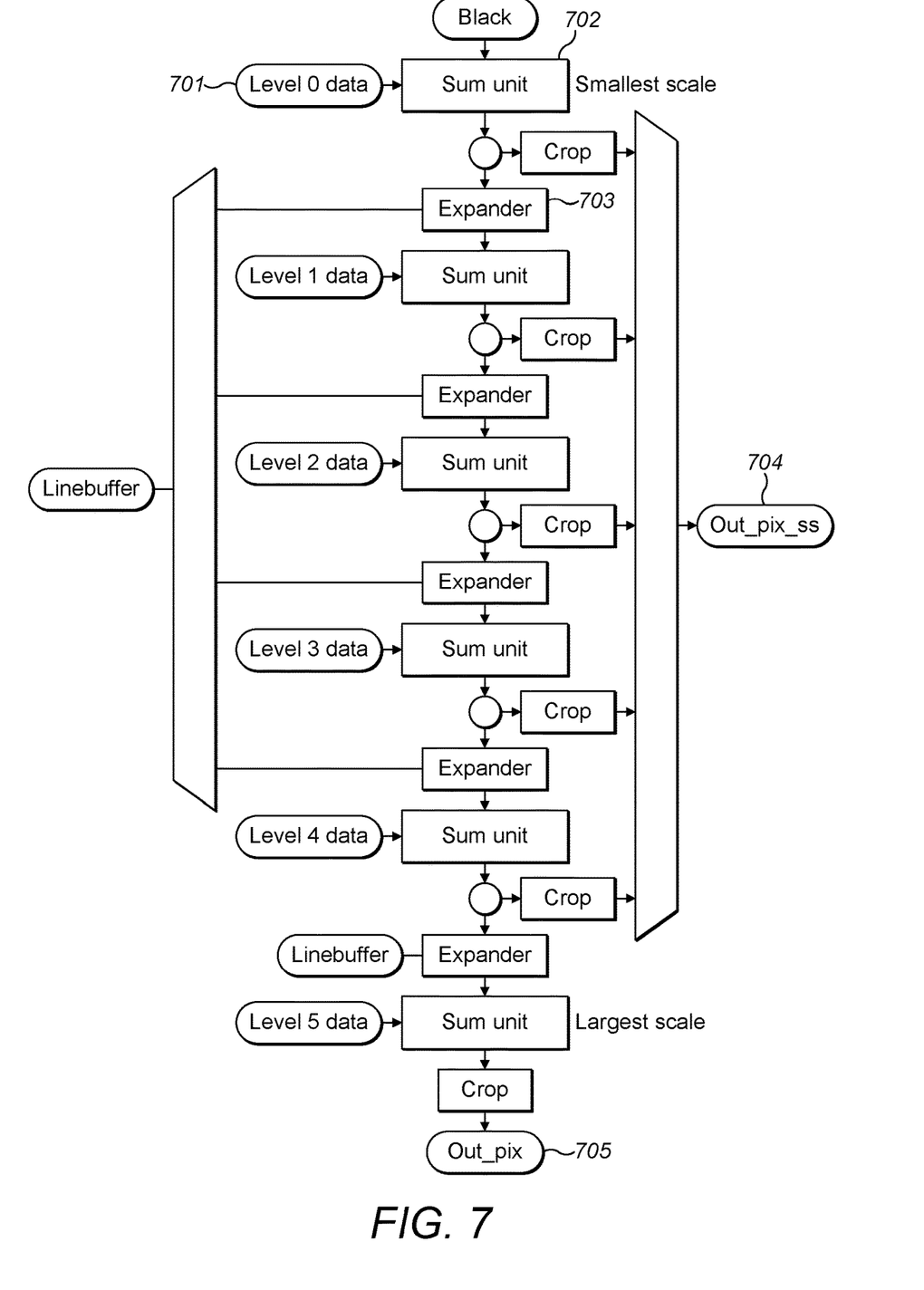
FIG. 7 shows a detailed example of a pyramid sum block.

An example of a pyramid sum block is shown in FIG. 7. The block comprises a repeating pipeline of expand filters 703 and sum blocks 702. Each sub-pipeline is configured to receive an image from one respective level of the Laplacian pyramid 701. The structure is simpler than that described in UK Patent Application Number 1606746.4, since the Laplacians have already been calculated by the Laplacian generation block.

The pyramid sum block performs the following functions:
Normalising the alpha values
Applying the gain coefficients to the Laplacian pyramid.
Blending the different source images together for each of the pyramid's levels.
Summing the blended levels together.

The sum blocks sum together the levels of the Laplacian pyramid. For each pixel at level k in the output the sum block calculates:

$$A(k) = \text{Expand}\,(A(k-1)) + \sum_{\text{Channel}\,i} g_i \alpha_i(k) L_i(k),$$

$g_i$ is the gain coefficient, $\alpha_i$ is a normalised value of the alpha mask and $L_i$ is the Laplacian for this level. The gain coefficients are 16-bit values for each frame. They map to the range [0, 4). The lowest level is given by:

$$A_0 = \sum_{\text{Channel}\,i} g_i \alpha_i(0) L_i(0).$$

Care should be taken with the chroma channels on the lowest level. Chroma values may be offset to keep the values greater than zero. This offset should be removed before multiplication and replaced again post multiplication. This does not affect other levels of the pyramid, since in higher levels only the difference between chroma channels is present.

The example of a pyramid sum block shown in FIG. 7 is controlled over an AXI4-Lite register interface. The images corresponding to different levels of the Laplacian pyramid are streamed in over an AXI4-Stream interface. Preferably those images are output by a decompression block such as the one illustrated in FIG. 6. The pyramid block also has two AXI4-Stream outputs, one for the highest scale 705 and another for one of the other scales in the pyramid 704. The level of the pyramid output by second output 704 may be selectable via the register interface. Each output can be cropped with an arbitrary crop rectangle specified via the register interface. The block operates on YUV420A quads and processes one quad per cycle. The width and height of the lowest (smallest) level of the pyramid is preferably even so that each level contains a whole number of quads. The block runs at 600 MHz, which gives a throughput of 80 Mpixels/frame at 30 frames/second.

As mentioned above, UK Patent Application Number 1606746.4 describes a transform and filter block that generates a series of progressively decimated images and then stores those reduced images in memory. The apparatus described herein comprises an operational block that calculates the Laplacian pyramid from the Gaussian pyramid by expanding the Gaussian images and subtracting those expanded images from their Gaussian counterparts. It is this Laplacian pyramid that is written to memory as the one intermediate write back to memory during the stitching operation. The Laplacian pyramid is well suited to compression—as described above—and storing the Laplacian pyramid rather than the Gaussian pyramid offers a significant reduction in compression complexity.

The structures shown in the figures herein are intended to correspond to a number of functional blocks in an apparatus. This is for illustrative purposes only. The figures are not intended to define a strict division between different parts of hardware on a chip or between different programs, procedures or functions in software. In many embodiments, some or all of the procedures described herein are likely to be performed predominantly in hardware. For example, any or all of the functional blocks comprised in the image processing pipeline described above might be implemented on an integrated circuit, including an appropriately configured application specific integrated circuit (ASIC) or a field-programmable gate array (FPGA). In some implementations, some or all of the procedures described herein may be implemented by a processor acting under software control. Any such software is preferably stored on a non-transient computer readable medium, such as a memory (RAM, cache, FLASH, ROM, hard disk etc.) or other storage means (USB stick, FLASH, ROM, CD, disk etc). Any of the functional units described herein might be implemented using processing power that is accessible as part of the cloud.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:
1. An image processing apparatus comprising:
an input configured to receive an image;
a Laplacian generator configured to generate, from the image, a Laplacian pyramid that represents the image as a series of frames that contain different frequency components of the image, wherein each frame of the frames corresponds to a respective level of the Laplacian pyramid; and a compressor configured to make a determination of whether to compress each frame of the frames in dependence on which level of the Laplacian pyramid the respective frame corresponds and configured to compress the Laplacian pyramid by compressing some, but not all, of the frames in the series for writing to memory in dependence on the determination, wherein each frame of the frames is formed from a plurality of values, each value of the plurality of values belongs to a channel, and the compressor comprises a predictor that is configured to perform a prediction on some, but not all, of the channels, and wherein one or more of the channels corresponds to blending data that defines how to blend frames generated from different images, and the predictor is configured to perform a prediction on a channel that corresponds to blending data.

2. The image processing apparatus as claimed in claim 1, wherein the compressor comprises an encoder that is configured to compress a frame by assigning a respective code to each value in the frame.

3. The image processing apparatus as claimed in claim 2, wherein the encoder is configured to assign codes that are formed from variable numbers of bits.

4. The image processing apparatus as claimed in claim 2, wherein the encoder is configured to assign the codes to enable the number of bits in a code to be dependent on a magnitude of the value to which that code is assigned.

5. The image processing apparatus as claimed in claim 2, wherein the encoder is configured to assign the codes to enable values having a first magnitude to be assigned codes formed from more bits than codes that are assigned to values having a second magnitude, and the first magnitude is greater than the second magnitude.

6. The image processing apparatus as claimed in claim 1, wherein the compressor comprises a quantiser that is configured to set some of the plurality of values to zero.

7. The image processing apparatus as claimed in claim 6, wherein the quantiser is configured to determine whether to set the some of the plurality of values to zero depending on respective magnitudes of the some of the plurality of values.

8. The image processing apparatus as claimed in claim 1, wherein each channel of the channels corresponds to a different type of data, and the predictor is configured to determine whether to perform a prediction on a channel in dependence on a type of the data that the channel corresponds to.

9. The image processing apparatus as claimed in claim 1, wherein one or more of the channels corresponds to pixel data that defines an appearance of a pixel, and the predictor is configured not to perform a prediction on a channel that corresponds to pixel data.

10. A method comprising:
receiving an image;
generating, from the image, a Laplacian pyramid that represents the image as a series of frames that contain different frequency components of the image, wherein each frame of the frames corresponds to a respective level of the Laplacian pyramid;

determining whether to compress a frame in dependence on which level of the Laplacian pyramid the frame corresponds to; and compressing some, but not all, of the frames in the series for writing to memory in dependence on the determining, wherein the compressing comprises compressing the frames in the series excluding the frames in the series corresponding to the smallest three levels of the Laplacian pyramid, or compressing the frame in the series corresponding to the largest level of the Laplacian pyramid and the frames in the series corresponding to levels that are greater than 2% of a size of the largest level of the Laplacian pyramid.

11. A non-transient computer readable medium having a software program for performing the method of claim 10 by a processor.

12. An image processing apparatus comprising:
an input configured to receive an image;
a Laplacian generator configured to generate, from the image, a Laplacian pyramid that represents the image as a series of frames that contain different frequency components of the image, each frame of the frames being formed from a plurality of values; and a compressor configured to compress the Laplacian pyramid for writing to memory, the compressor comprising:
a quantiser configured to quantise some, but not all, of the plurality of values, the quantiser being configured to quantise the some, but not all, of the plurality of values by setting the some, but not all, of the plurality of values to zero and determine which values of the plurality of values to set to zero in dependence on respective magnitudes of the values of the plurality of values, wherein the quantiser is configured to set all values that are within a predetermined magnitude of zero to zero, and wherein the compressor comprises a rate controller that is configured to control how the quantiser varies the predetermined magnitude in dependence on a current bit rate.

13. The image processing apparatus as claimed in claim 12, wherein the quantiser is configured to vary the predetermined magnitude within a frame.

14. The image processing apparatus as claimed in claim 12, wherein the rate controller is configured to control how the quantiser varies the predetermined magnitude in order to achieve a target bit rate.

15. The image processing apparatus as claimed in claim 14, wherein the rate controller is configured to control how the quantiser varies the predetermined magnitude within a frame in dependence on a difference between a number of bits already used to encode the frame and a target number of bits for encoding a part of the frame that has already been encoded.

* * * * *